UNITED STATES PATENT OFFICE.

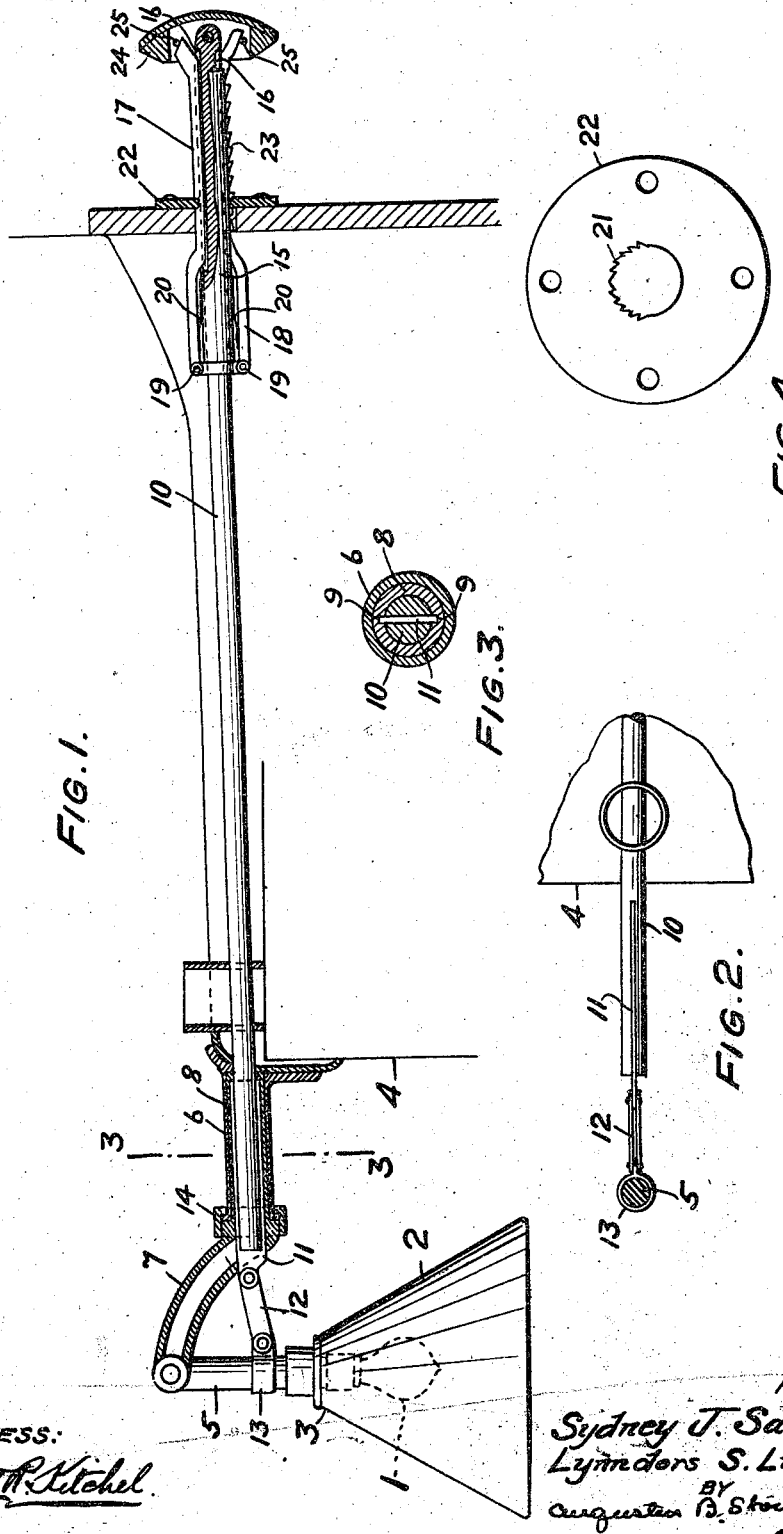

LYNNDORS S. LUCUS AND SYDNEY J. SANFORD, OF PHILADELPHIA, PENNSYLVANIA.

DIRIGIBLE LIGHT FOR AUTOMOBILES.

1,290,609.  Specification of Letters Patent.  Patented Jan. 7, 1919.

Application filed February 25, 1918. Serial No. 218,972.

*To all whom it may concern:*

Be it known that we, LYNNDORS S. LUCUS and SYDNEY J. SANFORD, both citizens of the Dominion of Canada, and residents of Philadelphia, in the county of Philadelphia and State of Pennsylvania, U. S. A., have invented certain new and useful Improvements in Dirigible Lights for Automobiles, of which the following is a specification.

The principal objects of the present invention are, to provide an illumination which may be confined to the front portions of an automobile and to the ground in their immediate vicinity, and which may be directed laterally or projected for some distance from the car, second, to provide for confining the illumination to the front parts of each of two approaching cars whereby the driver of each car may plainly see the other, while at the same time the road or ground in the immediate vicinity of each car is sufficiently illuminated, and third, to provide comparatively simple, reliable and efficient mechanism for supporting a light and its reflector and for permitting them to be turned properly for the accomplishment of the above mentioned objects.

The invention will be claimed at the end hereof, but will be first described in connection with the embodiment of it selected from other embodiments for the sake of illustration in the accompanying drawings, forming part hereof, and in which—

Figure 1, is a side view, partly in central section, illustrating a dirigible lamp support embodying features of the invention.

Fig. 2, is a top view, with parts removed, of the left-hand end of Fig. 1.

Fig. 3, is an enlarged section on the line 3—3 of Fig. 1, and

Fig. 4, is an enlarged view of the plate shown in section at the right-hand of Fig. 1.

In the drawings, the light 1 and its opaque reflector 2, or collectively the lamp 3, is arranged in front of the middle portion of the hood 4 and depends below the top of the hood. The shank or stem 5, of the lamp extends backward from the reflector in the line of the axis thereof or, as shown, upward with respect to the ground toward which the front of the reflector is directed. 6, is a tubular support secured to the hood and providing a horizontal axis or bearing ranging in the direction of the length of the car. 7, is a curved bracket having at one end a tubular pintle 8, arranged to turn in the support 6 and provided with key-ways 9. At its other end this bracket is pivoted to the stem 5 of the lamp, and for this purpose it is shown as forked. The lamp 5, is pendant from the bracket 7. The bracket 7 is therefore turnable about a horizontal axis and the lamp can be swung in the plane of the bracket in any angular position thereof. 10. is an operating rod extending from a point convenient to the driver through the tubular pintle 8, with which it is connected for turning but not for endwise movement by a key 11, shown as fitted in a fork in the end of the rod and as working in the key-ways 9. A link 12, pivotally connects the rod 10 and the lamp 3, as shown this link 12 is pivoted to the key 11, and to a collar 13 on the stem 5 of the lamp. 14, is a means for securing the bracket 7, against accidental detachment from the support while permitting it to turn therein. 15, is a sleeve fast on the rod 10 and both the sleeve and rod are provided with axial grooves 16. 17 and 18 are bars pivotally connected with ears 19 on the sleeve 15 and normally pressed by springs 20 to project from the grooves 16, but adapted to be pushed into those grooves against the force of the springs. One of these bars 17, coöperates with notches 21, in the wall of an opening in a plate 22, secured to the dash, to prevent and permit turning the rod 10, and the other bar 18, is provided with teeth 23 which coöperate with the plate 22, to prevent and permit end movement of the rod 10. 24 is a knob or handle pivoted to the end of the rod 10 and provided with pins 25 coöperating with cam surfaces on the ends of the bars, in such a way that when the knob 24 is tilted counter-clock-wise the bars are caused to recede into their notches 16 and clearing the plate 22 and permitting of turning and end movement of the rod 10. When the knob is released, the springs 20 return it to the position shown in the drawings in which the bars and plate are interlocked and hold the rod.

In use the lamp 3 may be positioned as shown in the drawings to shed light on the front parts of the car and upon the road or ground in their immediate vicinity, which is desirable because by thus confining the illumination the driver of an approaching vehicle can see the car and so avoid it, while at the same time the driver of the car can sufficiently see the road. If desired and by manipulating the handle or knob 24 in the manner described, the rod 10 can be moved endwise, swinging the lamp 3 toward or away from the car, and thus projecting or retracting the field of illumination, and the field of illumination may be thrown to either side by turning the knob and rod 10. At no time does the light of the lamp interfere with the proper vision of the driver of the car or with the proper vision of the drivers of approaching vehicles.

We claim:

1. A light for automobiles comprising the combination of a lamp having a rearwardly extending stem and having a forward reflector co-axial with the stem, a support mounted centrally of an automobile hood and provided with a bearing ranging lengthwise of the automobile, a bracket carried by the support and rotatable in said bearing and to which the stem is hinged to permit the lamp to normally shine downward, a handle accessible to the driver, and means operated by the handle and adapted to turn the bracket and also to swing the lamp in the plane of the bracket, substantially as described.

2. A dirigible light for automobiles comprising the combination of a tubular support constituting a horizontal axis and adapted for application to the central portion of an automobile hood, a bracket having a tubular pintle mounted in said support, a lamp pendant from the free end of the bracket for swinging movement in the plane thereof, an operating handle accessible to the driver, a rod extending from the handle through said pintle, key and key-way connections between the rod and pintle, and a pivotal link connecting the rod and lamp, substantially as described.

3. A dirigible light for automobiles comprising the combination of a tubular support constituting a horizontal axis and adapted for application to the central portion of an automobile hood, a bracket having a tubular pintle mounted in said support, a lamp pendant from the free end of the bracket for swinging movement in the plane thereof, an operating handle accessible to the driver, a rod extending from the handle through said pintle, and having a forked end, a key mounted in said forked end and working in ways provided in the pintle, and a link pivoted to the key and to the stem of the lamp, substantially as described.

4. A dirigible light for automobiles comprising the combination of a tubular support constituting a horizontal axis and adapted for application to the central portion of an automobile hood, a bracket having a tubular pintle mounted in said support, a lamp pendant from the free end of the bracket for swinging movement in the plane thereof, an operating handle accessible to the driver, a rod extending from the handle through said pintle and connected with the lamp and bracket, a plate having an opening with a notched wall and through which the rod passes, and spring bars radially compressible in respect to the rod and operable by the knob and of which one coöperates with notched wall and the other is provided with teeth coöperating with the plate, substantially as described.

5. A dirigible light for automobiles comprising the combination of, a bracket turnable about a horizontal axis ranging fore and aft, a lamp pendant from the bracket for swinging in the plane thereof, a plate having an opening with a notched wall, a turnable and endwise movable rod extending through the opening and connected with the lamp and bracket, a handle pivoted to the rod, and spring pressed bars connected with the rod and radially expansible and contractible in respect to the opening by tilting the handle and of which one is toothed, substantially as described.

L. S. LUCUS.
SYDNEY J. SANFORD.